United States Patent [19]

Raj et al.

[11] Patent Number: 4,772,032
[45] Date of Patent: Sep. 20, 1988

[54] COMPACT MAGNETIC FLUID LOW PRESSURE SEAL

[75] Inventors: Kuldip Raj, Merrimack; Ronald Moskowitz, Hollis, both of N.H.

[73] Assignee: Ferrofluidics Corporation, Nashua, N.H.

[21] Appl. No.: 20,460

[22] Filed: Mar. 2, 1987

[51] Int. Cl.$^4$ .................. F16J 15/40; F16J 15/54
[52] U.S. Cl. .................... 277/80; 277/135; 384/133
[58] Field of Search .............. 277/1, 80, 135; 384/133, 477, 478

[56] References Cited

U.S. PATENT DOCUMENTS

| | | | |
|---|---|---|---|
| 3,620,584 | 11/1971 | Rosensweig | 277/80 |
| 4,293,137 | 10/1981 | Ezekiel | 277/80 |
| 4,407,518 | 10/1983 | Moskowitz et al. | 277/1 |
| 4,486,026 | 12/1984 | Furumura et al. | 277/80 |
| 4,526,380 | 7/1985 | Raj et al. | 277/80 |
| 4,526,382 | 7/1985 | Raj et al. | 277/80 |
| 4,545,587 | 10/1985 | Higgins | 277/80 |
| 4,598,914 | 7/1986 | Furumura et al. | 384/133 X |
| 4,604,229 | 8/1986 | Raj et al. | 277/135 X |

FOREIGN PATENT DOCUMENTS

| | | | |
|---|---|---|---|
| 59-231271 | 12/1984 | Japan | 277/80 |
| 60-172776 | 9/1985 | Japan | 277/80 |
| 655858 | 4/1979 | U.S.S.R. | 277/80 |
| 781469 | 11/1980 | U.S.S.R. | 277/80 |
| 892105 | 12/1981 | U.S.S.R. | 277/80 |

*Primary Examiner*—Robert S. Ward
*Attorney, Agent, or Firm*—Wolf, Greenfield & Sacks

[57] ABSTRACT

A bearing and magnetic fluid seal assembly includes a shaft mounted by axially spaced-apart bearings for rotation relative to a housing. A magnetic fluid seal includes an annular magnet axially positioned between the bearings in the space that is wasted and not utilized for any purpose, and a thin, disk-like annular polepiece positioned between one of the bearings and the environment to be protected by the seal. Magnetic flux from the magnet is conducted by a magnetically permeable housing or shaft to an annular gap between the inside diameter of the polepiece and the shaft. A magnetic fluid is retained in the gap by the magnetic flux, thereby providing an exclusion seal. Embodiments utilizing radially and axially polarized magnets are provided. A magnetic fluid seal can be provided at each end of the assembly. The bearings supporting the shaft can be magnetically permeable or nonmagnetic. The seal(s) can be electrically conducting or nonconducting depending upon the type of ferrofluid used.

14 Claims, 9 Drawing Sheets

COMPACT MAGNETIC FLUID LOW PRESSURE SEAL

FIELD OF THE INVENTION

This invention relates to a magnetic fluid seal assembly and, more particularly, to a compact magnetic fluid seal assembly with a short axial length which is particularly useful in a computer magnetic disk drive. The seal may be electrically conducting or nonconducting, depending upon the type of ferrofluid used.

BACKGROUND OF THE INVENTION

In modern disk drive assemblies, the mechanical clearance between the surface of the magnetic disk which stores data and the read/write head which transfers data to and from the disk is extremely small, i.e., about 10 microinches. Any particulate contamination on the disk surface or in the region of the read/write head is likely to cause a malfunction of the assembly. Consequently, the computer disk and the head must be enclosed and must be protected against contamination from the outside environment. The motor which drives the disk shaft and the bearings which support the disk shaft are sources of contamination due to their mechanically movable parts. However, it is generally inconvenient to enclose the motor. Thus, a magnetic fluid exclusion seal is typically employed on the drive shaft to prevent contaminants from the motor and the bearings and from the external environment from reaching the interior of the disk assembly along the drive shaft.

The trend toward miniaturization of disk drives has required thinner and thinner drives, thereby severely limiting the axial space available for magnetic fluid seals and bearings, and requiring designs with a very small axial length or thickness. Magnetic fluid seals for use in small disk assemblies such as 5¼ inch and 3½ inch spindles are typically required to have an axial thickness on the order of 1 mm, while disk shaft bearings are typically required to have an axial thickness on the order of 5 mm.

A variety of bearing assemblies and separate magnetic fluid seals to perform the exclusion function have been disclosed in the prior art. Although such configurations function satisfactorily, they do not meet the seal thickness requirements of present disk drives. For example, U.S. Pat. No. 4,293,137, issued Oct. 6, 1981 to Ezekiel, discloses a seal configuration wherein annular magnets are positioned at opposite ends of a bearing with a magnetic fluid seal in the gap between each annular magnet and the shaft. This configuration is not suitable for use in applications requiring a very small axial dimension such as the disk drive assembly described above, since a reduction in magnet thickness would reduce the magnetic field below the level required for holding the magnetic fluid in the seal area. Bearing and seal assemblies wherein a seal is axially positioned between two bearings which support a shaft are disclosed in U.S. Pat. No. 4,526,380, issued July 2, 1985 to Raj et al and U.S. Pat. No. 4,407,518, issued Oct. 4, 1983 to Moskowitz et al. Although the disclosed seals do not add to the axial length of the assembly, the seals do not exclude contaminants generated by the bearing adjacent to the disk area.

It a general object of the present invention to provide improved magnetic fluid seal assemblies.

It is another object of the present invention to provide magnetic fluid seal assemblies with a very small axial dimension.

It is a further object of the present invention to provide magnetic fluid seal assemblies which are easily manufactured and which are low in cost.

SUMMARY OF THE INVENTION

According to the present invention, these and other objects and advantages are achieved in a magnetic fluid seal assembly comprising a housing, a shaft having an axis of rotation, a bearing assembly for supporting the shaft and for permitting rotation of the shaft relative to the housing, and a magnetic fluid seal. The bearing assembly includes at least two axially spaced-apart bearings between the shaft and the housing. The magnetic fluid seal includes magnet means for producing a magnetic field axially positioned between the bearings in a space that remains generally unutilized and further includes polepiece means axially positioned outside the bearing assembly between the bearing assembly and the environment to be protected by the seal. The polepiece means includes an annular polepiece extending inwardly from the housing toward the shaft, and having a closely-spaced, noncontacting relationship with the shaft, thereby defining a gap between the polepiece and the shaft. A magnetic fluid is retained by the magnetic field in the gap between the polepiece and the shaft to provide an exclusion seal. Either the housing or the shaft, or in some cases both, are magnetically permeable so that at least a portion of the magnetic flux is conducted between the magnet means and the gap between the polepiece and the shaft. Preferably, the annular polepiece is a thin, annular disk and the seal is formed on the shaft between the bearing and the disk enclosure, or other environment to be protected, without adding appreciably to the axial dimension of the assembly.

Included within the scope of the invention are configurations with radially and axially polarized magnet means positioned between the bearings. In addition, annular polepieces can be positioned outside the bearing assembly at each end for additional sealing. The magnetic field can be provided by a single annular magnet or by a pair of spaced-apart annular magnets between the bearings.

BRIEF DESCRIPTION OF THE DRAWINGS

For a better understanding of the present invention together with other and further objects, advantages and capabilities thereof, reference is made to the accompanying drawings which are incorporated herein by reference and in which.

DESCRIPTION OF THE PRIOR ART

Figure 1:
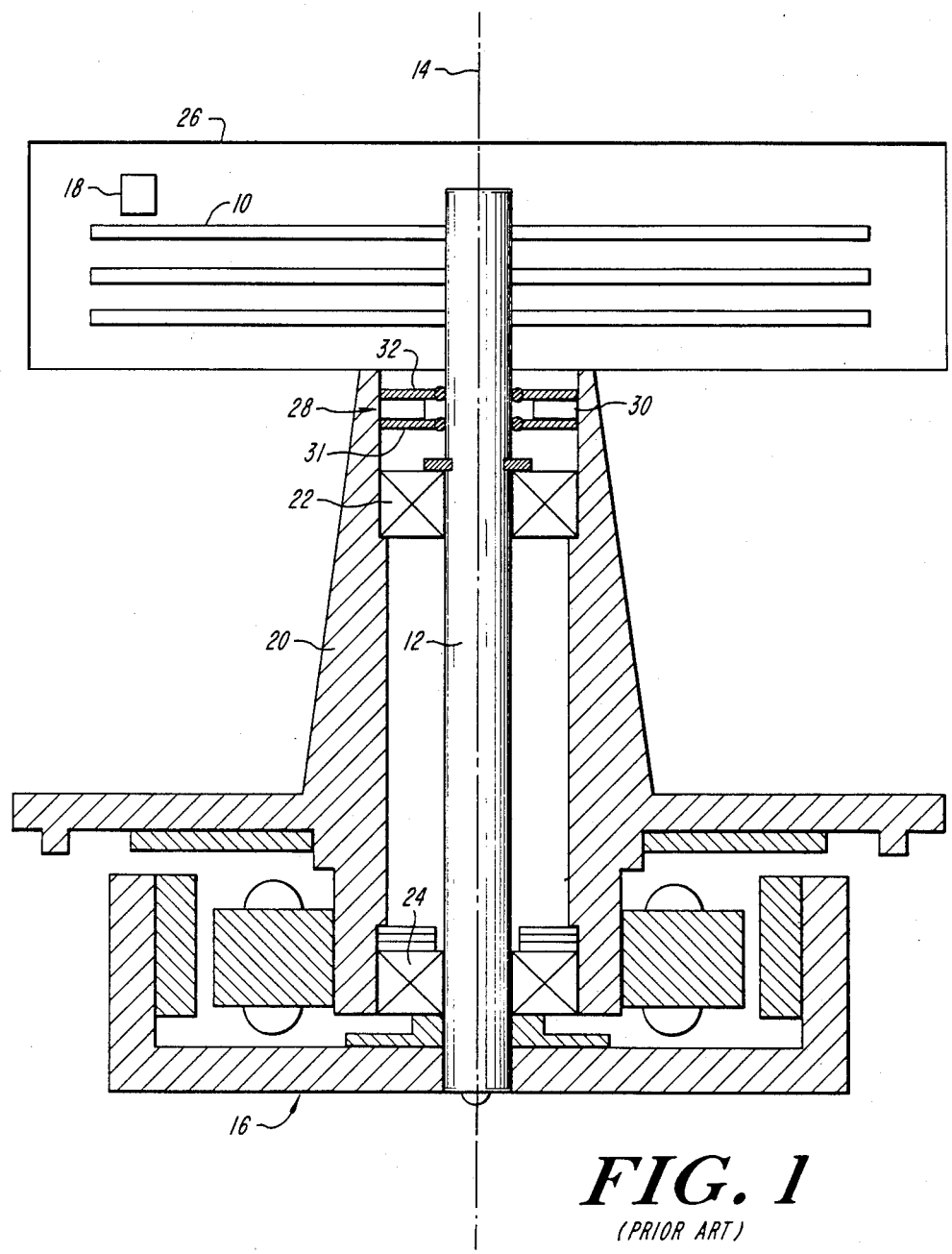
FIG. 1 is a cross-sectional view of a bearing and magnetic fluid seal assembly in accordance with the prior art.

A computer disk drive assembly in accordance with the prior art is shown in FIG. 1. One or more magnetic disks 10 are attached at their center to a spindle shaft 12. The shaft 12 and the magnetic disk 10 are caused to rotate about an axis 14 by a motor 16. Information is transferred to and from the disks 10 by a disk head 18. A housing 20 supports the motor 16 and a pair of bearings 22, 24 which are spaced along and support the shaft 12. The space between the two bearings 22, 24 is empty and not utilized for any purpose. The disks 10 are protected against contamination by a cover enclosure 26. Positioned along the shaft 12 between upper bearing 22 and the interior of cover enclosure 26 is a magnetic fluid seal 28 which typically includes an annular magnet 30 and annular polepieces 31, 32 at opposite ends of magnet 30. The magnet 30 and polepieces 31, 32 are attached to housing 20 and are dimensioned so that gaps are defined between the inner edges of polepieces 31, 32 and shaft 12. A magnetic fluid 33 is retained in the gaps by the magnetic field of magnet 30. The seal 28 excludes contaminants generated by bearings 22, 24, motor 16 and by the external environment from reaching the interior of enclosure 26. The drawback to the configuration shown in FIG. 1 is that the magnetic fluid seal 28 adds directly to the axial length of the assembly and typically has an axial dimension on the order of 3.8 mm.

DETAILED DESCRIPTION OF THE INVENTION

Figure 2:
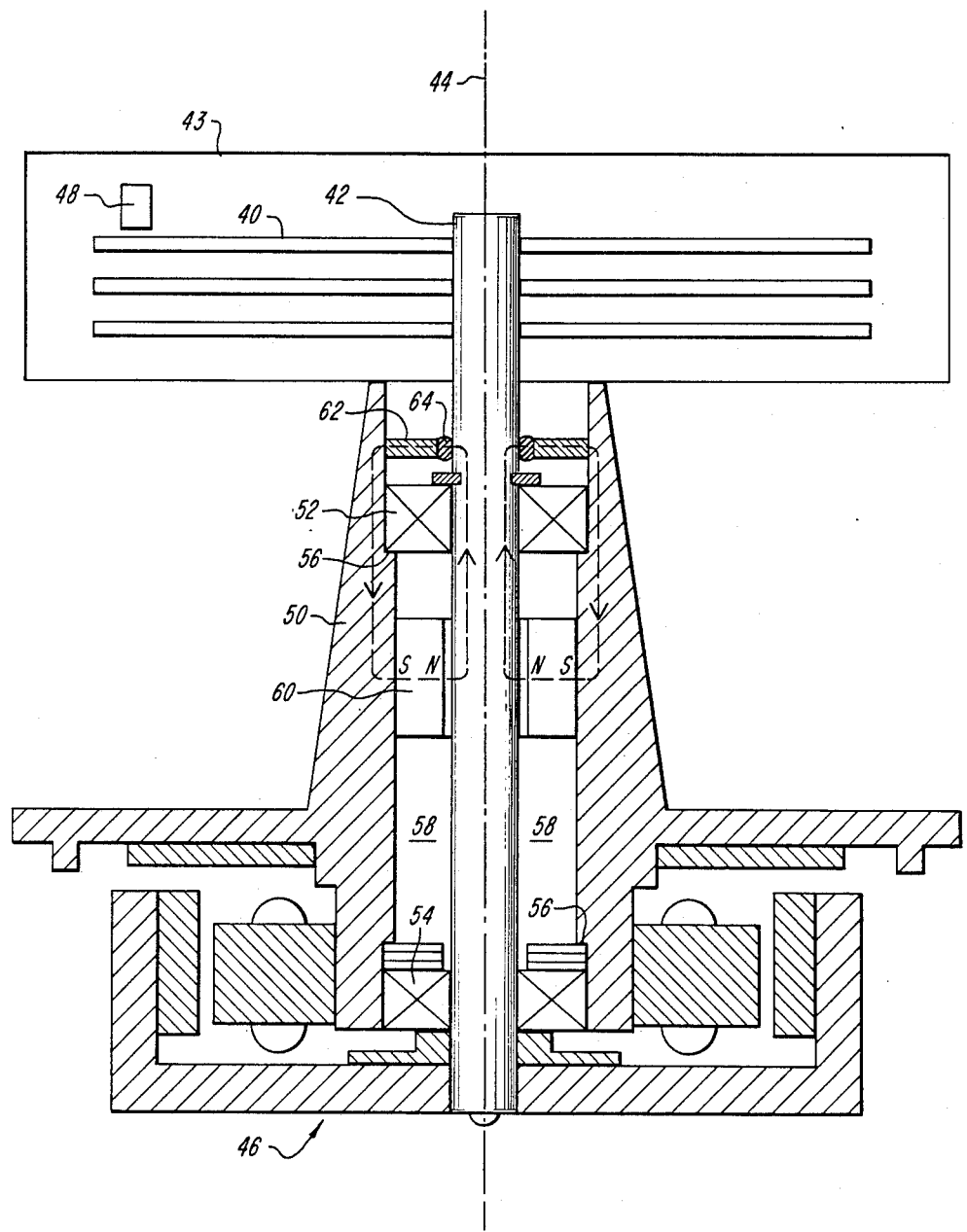
FIG. 2 is a cross-sectional view of a bearing and magnetic fluid seal assembly in accordance with the present invention utilizing a radially polarized magnet attached to the housing.

A computer disk drive assembly incorporating a bearing and magnetic fluid seal assembly in accordance with the present invention is shown in FIG. 2. One or more magnetic disks 40 are attached at their center to a spindle shaft 42 and are enclosed by a cover enclosure 43. The shaft 42 and the magnetic disks 40 are caused to rotate about an axis 44 by a motor 46 attached to the shaft 42. Information is transferred to and from the disks 40 by a disk head 48. A housing 50 supports the motor 46 and a bearing assembly comprising a pair of bearings 52, 54. The bearings 52, 54 are axially spaced apart by a sufficient distance to support the shaft 42 for rotation about the axis 44. The spacing can be determined by a cylindrical spacer (not shown) or by shoulders 56 on housing 50. Typically, bearings 52, 54 are ball bearings with a short axial length. However, any suitable bearing can be utilized. An annular space 58 between shaft 42 and housing 50 is closed at its ends by bearings 52, 54.

In accordance with the present invention, a compact magnetic fluid exclusion seal is formed by an annular magnet positioned in the space 58 between bearings 52 and 54, at least one polepiece axially positioned between bearing 52 and the environment to be protected against contamination, and a magnetic fluid in a gap between the polepiece and the shaft. Either the housing 50 or the shaft 42 is made of a magnetically permeable material to conduct magnetic fields from the magnet to the polepiece. The magnetic fluid is retained in the gap between the polepiece and the shaft by the magnetic field. The bearing and magnetic fluid seal assembly of the present invention can be utilized with a fixed housing and rotating shaft or with a fixed shaft and rotating housing. The preferred embodiments of the invention are described hereinafter with reference to FIGS. 2-9.

Referring again to FIG. 2, a radially polarized annular magnet 60 is attached to housing 50 and has sufficient inside diameter to define a gap between the magnet 60 and shaft 42. The magnet 60 is located within the annular space 58, preferably in relatively close proximity to the bearing 52. An annular polepiece 62 having a thin, disk-like shape is attached at its outside diameter with a fixed seal to housing 50 and is located at the opposite end of bearing 52 from magnet 60 between bearing 52 and cover enclosure 43. The polepiece 62 has a closely-spaced, noncontacting relationship with shaft 42 so that a gap is defined between the inside diameter of polepiece 62 and the shaft 42. In the embodiment of FIG. 2, the housing 50, at least in the region between the annular magnet 60 and the polepiece 62, is made of a magnetically permeable material. The shaft 42 can be made of either magnetically permeable or nonmagnetic material. A magnetic field from the magnet 60 is conducted through the magnetic housing 50 and magnetic polepiece 62 to the gap between the polepiece 62 and the shaft 42. A magnetic fluid 64 is retained by the magnetic field in the annular gap between the polepiece 62 and the shaft 42, thereby forming a low pressure exclusion seal while permitting rotation of the shaft 42 relative to the housing 50.

The magnet 60 can be of low energy rigid or flexible ferrite type. The polepiece 62 is preferably a thin disk of magnetically permeable material but can have a relatively thick axial dimension if space permits. The clearance between the shaft 42 and the inside diameter of magnet 60 is large enough to divert magnetic flux through housing 50 to polepiece 62 so that the magnetic field retains magnetic fluid in the gap between the polepiece 62 and the shaft 42. In another feature of the invention, an electrically conducting magnetic fluid 64 can be utilized to conduct static charge from the disks 40 through shaft 42, polepiece 62 and housing 50, thereby grounding the rotating disks. The pole piece outer diameter in this case is electrially connected (with silver paint, conducting adhesive, etc.) with the housing.

In all the embodiments (FIGS. 2-9), the bearings 52 and 54 can be either magnetically permeable or nonmagnetic. If the bearings are magnetically permeable, some magnetic flux loss will occur through the bearings resulting in a lower flux density in the air gap of the magnetic fluid seal. However, a magnetic fluid seal capable of sustaining several mm H₂O of pressure capacity can still be realized.

Additional embodiments of the present invention are illustrated in FIGS. 3-9. In these embodiments, the disk drive assembly is the same as the assembly shown in FIG. 2 except for the details of the magnetic fluid seal construction and the requirements for the material of the housing 50 and the shaft 42. Accordingly, only the magnetic fluid seal construction and the material requirements for housing 50 and shaft 42 are described in detail.

Figure 3:
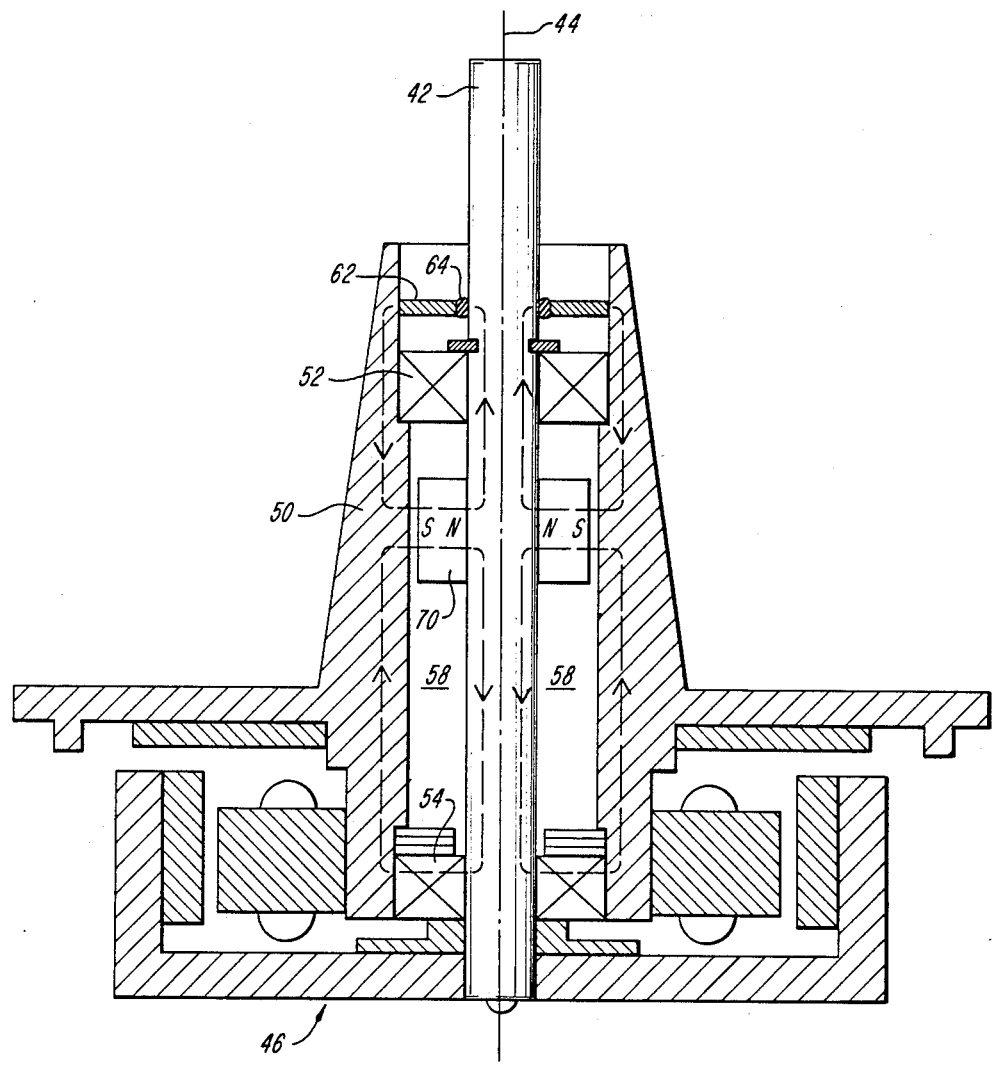
FIG. 3 is a cross-sectional view of a bearing and magnetic fluid seal assembly in accordance with the present invention utilizing a radially polarized magnet attached to the shaft.

With reference to FIG. 3, the annular polepiece 62 is located between bearing 52 and the environment to be protected by the seal in the same manner as described above in connection with FIG. 2. A radially polarized annular magnet 70 is attached to shaft 42 in the space 58 between bearings 52 and 54. In this embodiment, the shaft 42 is made of magnetically permeable material so as to conduct magnetic flux from the magnet 70 through the shaft 42 to the gap between the polepiece 62 and the shaft 42. The magnetic field retains magnetic fluid 64 in the gap. The housing 50 can be either magnetically permeable or nonmagnetic. A sufficient air gap is maintained between the outer diameter of magnet 70 and the inner diameter of housing 50 to divert the magnetic field to the seal formed by polepiece 62 and magnetic fluid 64.

Figure 4:
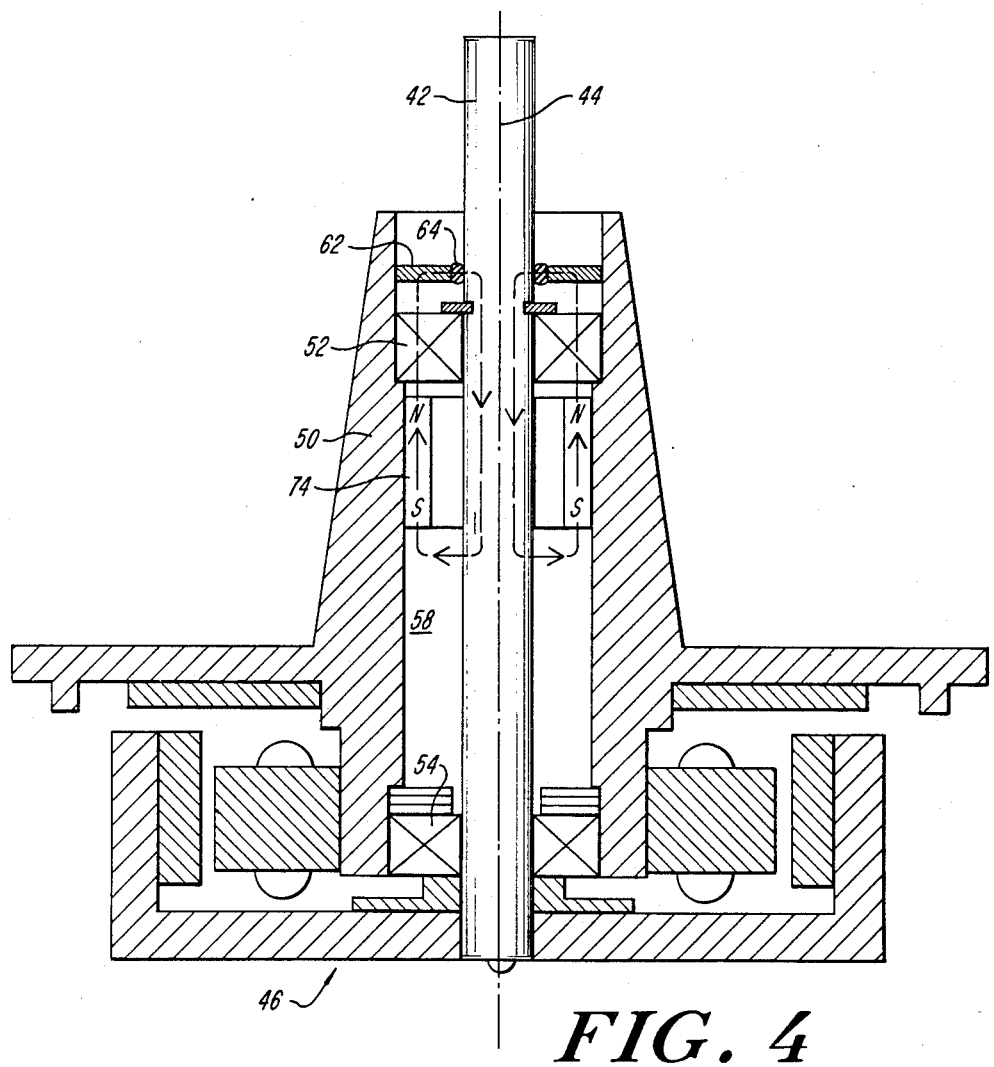
FIG. 4 is a cross-sectional view of a bearing and magnetic fluid seal assembly in accordance with the present invention utilizing an axially polarized magnet attached to the housing.

An embodiment of the present invention utilizing an axially polarized magnet is shown in FIG. 4. An axially polarized annular magnet 74 is located in the space 58 between bearings 52 and 54 and is attached to housing 50. Housing 50 must be made of a nonmagnetic material, at least in the region adjacent to magnet 74, to prevent magnetic shorting the magnet 74. The annular polepiece 62 and magnetic fluid 64 are located between bearing assembly 52 and the environment to be protected by the seal as described above in connection with FIG. 2. The magnetic field from magnet 74 passes through bearing 52 and polepiece 62 and retains magnetic fluid 64 in the gap between polepiece 62 and shaft 42. The shaft 42 is made of a magnetically permeable material to conduct magnetic flux from magnet 74 to polepiece 62 and magnetic fluid 64.

Figure 5:
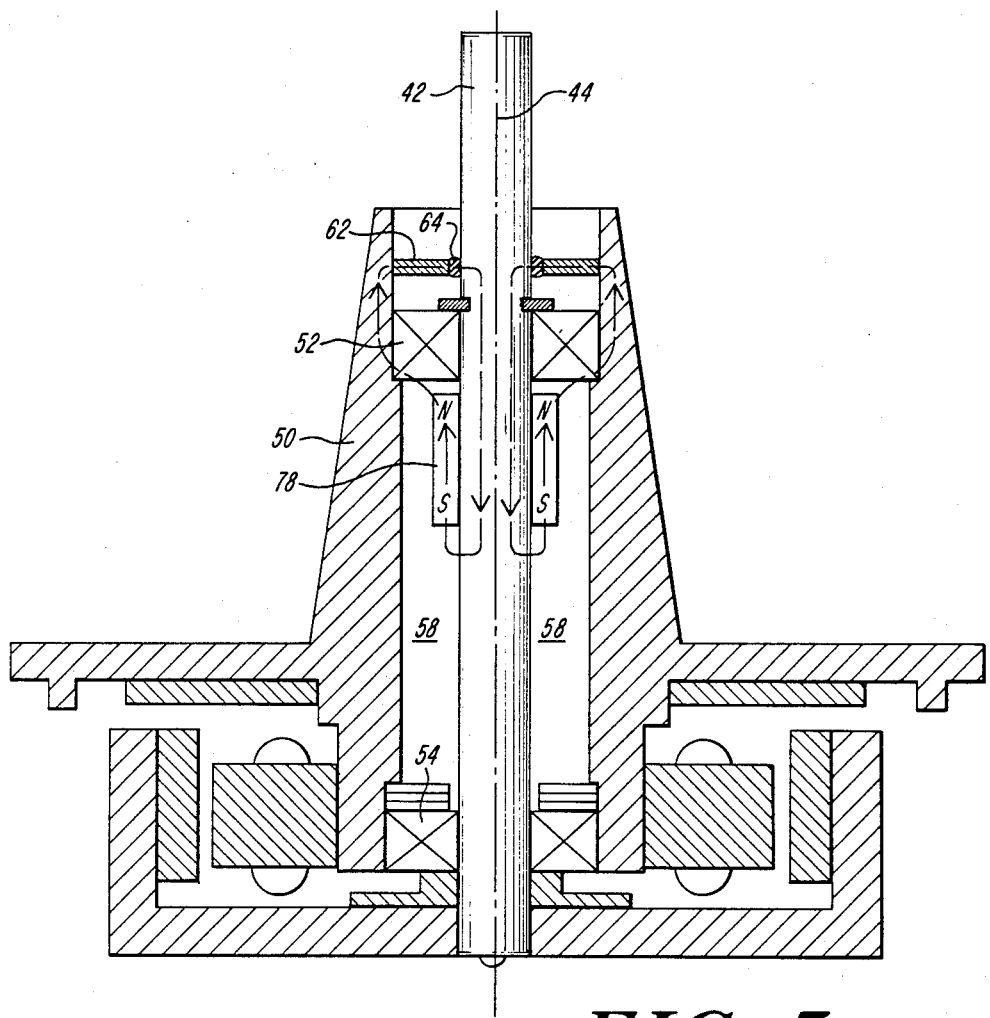
FIG. 5 is a cross-sectional view of a bearing and magnetic fluid seal assembly in accordance with the present invention utilizing an axially polarized magnet attached to the shaft.

Another embodiment utilizing an axially polarized magnet is shown in FIG. 5. An axially polarized magnet 78 is located in the space 58 between bearings 52 and 54 and is attached to the shaft 42. The shaft 42 is made of a nonmagnetic material to prevent magnetic shorting of the magnet 78. The annular polepiece 62 and magnetic fluid 64 are located between bearing 52 and the environment to be protected by the seal as described hereinabove in connection with FIG. 2. The housing 50 is made of a magnetically permeable material, at least in the region between magnet 78 and polepiece 62 so as to conduct magnetic flux from the magnet 78 to the polepiece 62 and thereby retain the magnetic fluid 64 in the gap between the polepiece 62 and the shaft 42.

Figure 6:
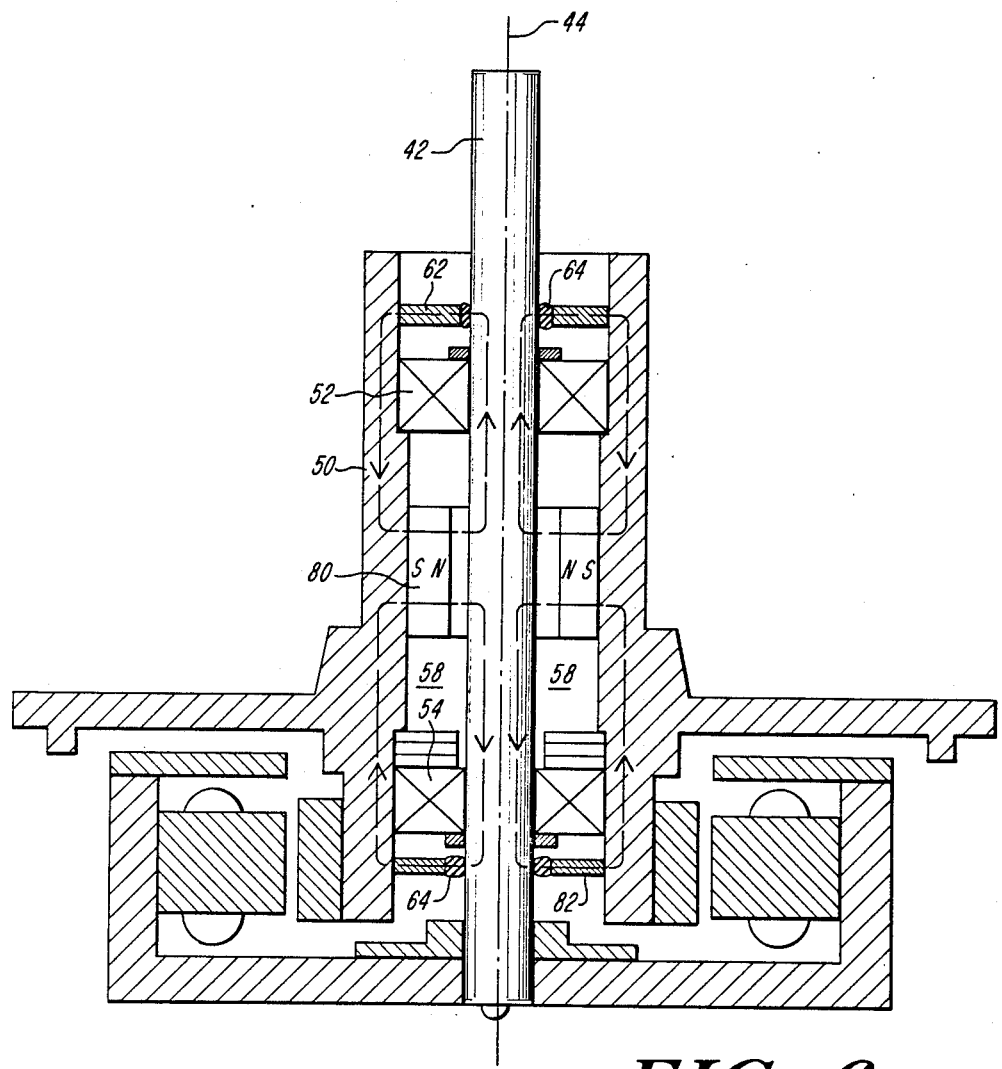
FIG. 6 is a cross-sectional view of a bearing and magnetic fluid seal assembly in accordance with the present invention utilizing a radially polarized magnet attached to the housing and polepieces at opposite ends of the bearing assembly.

A bearing and magnetic fluid seal assembly utilizing two magnetic fluid seals is shown in FIG. 6. A radially polarized annular magnet 80 is positioned in the annular space 58 between bearings 52 and 54 and is attached to housing 50. The polepiece 62 is located between bearing 52 and the environment to be protected by the seal as described above in connection with FIG. 2. The embodiment of FIG. 6 also includes a second disk-like annular polepiece 82 located on axis 44 in close proximity to the bearing 54. Polepiece 82 is on the opposite side of the bearing 54 from the magnet 80. The annular magnet 80 is centrally located between bearings 52 and 54 and is dimensioned so that its inside diameter is spaced from shaft 42. The housing 50 is made of a magnetically permeable material and conducts magnetic flux from magnet 80 to polepieces 62, 82. The shaft 42 can be made of either magnetically permeable or nonmagnetic material. Each of the polepieces 62, 82 is attached by a fixed seal at its outside diameter to housing 50 and is in closely-spaced, noncontacting relationship with the shaft 42 so as to define a gap between the inside diameter and the shaft 42. A magnetic fluid 64 is retained by the magnetic field in the respective gaps between the polepieces 62, 82 and the shaft 42. As a result, the embodiment of FIG. 6 provides two separate seals along the shft 42.

Figure 7:
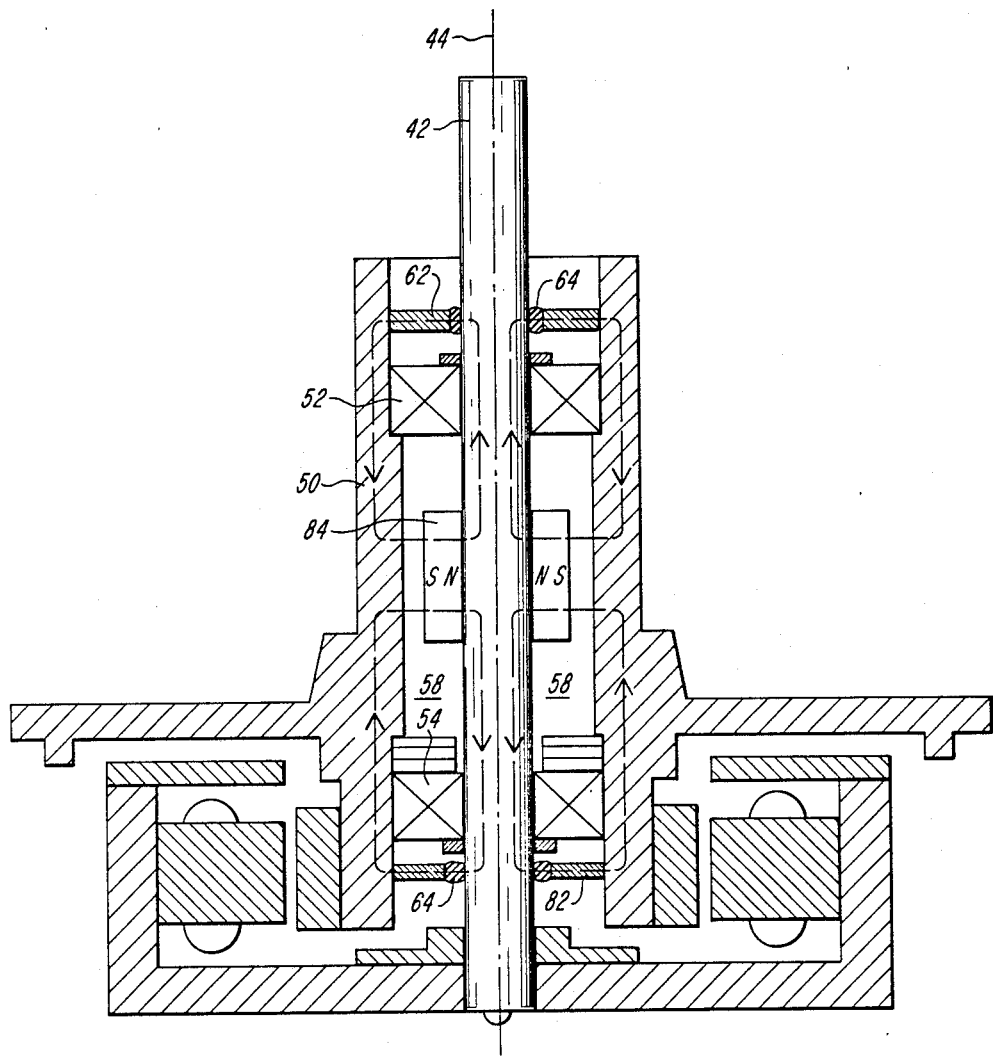
FIG. 7 is a cross-sectional view of a bearing and magnetic fluid seal assembly in accordance with the present invention utilizing a radially polarized magnet attached to the shaft and polepieces at opposite ends of the bearing assembly.

A variation of the embodiment of FIG. 6 is illustrated in FIG. 7. The polepieces 62, 82 are positioned at opposite ends of the bearing assembly as described above in connection with FIG. 6. A radially polarized annular magnet 84 is positioned in the space 58 between the bearings 52 and 54 and is attached to the shaft 42. The shaft 42 is magnetically permeable so that magnetic flux from magnet 84 is conducted through the shaft 42 to polepieces 62, 82 to thereby retain the magnetic fluid 64 in the gaps between each of the polepieces 62, 82 and the shaft 42. Housing 50 can be made of either magnetically permeable or nonmagnetic material. The outside diameter of magnet 84 is dimensioned so that it is spaced from the housing 50.

Figure 8:
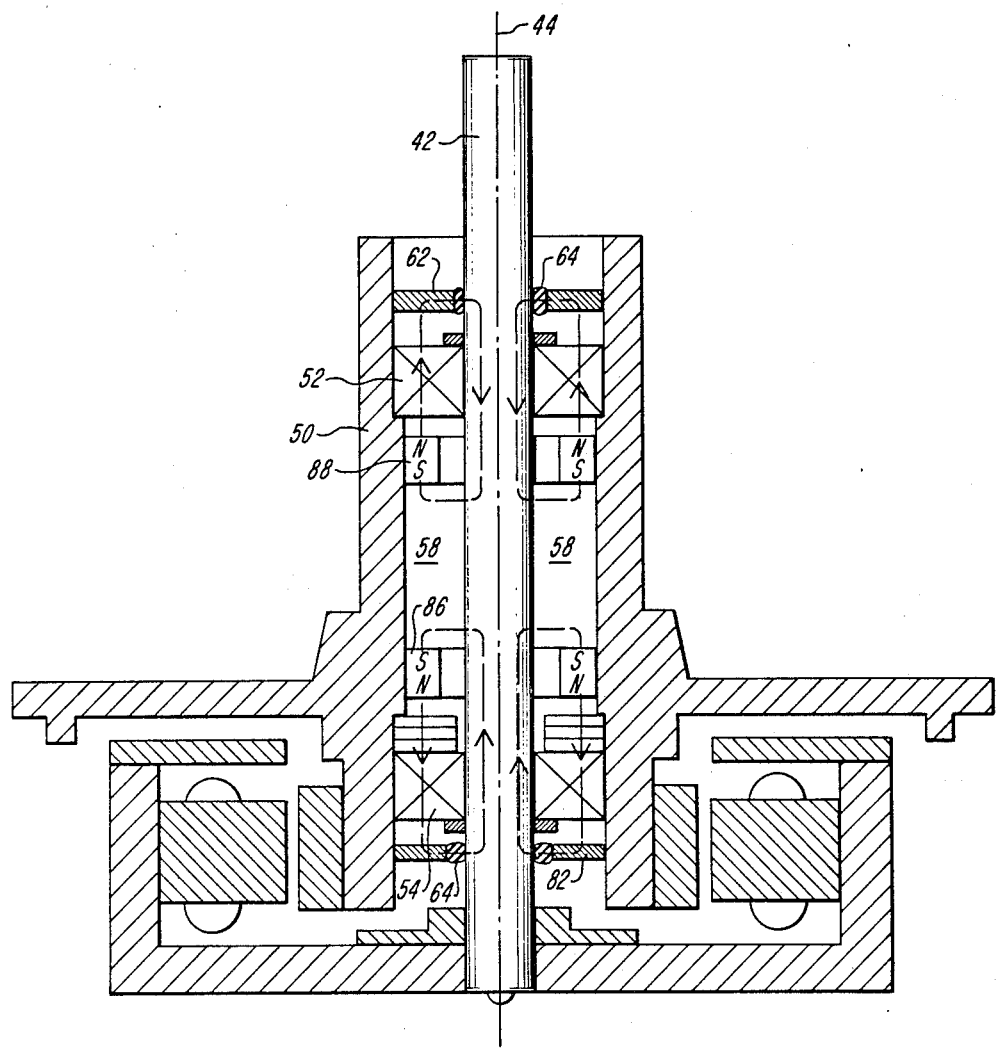
FIG. 8 is a cross-sectional view of a bearing and magnetic fluid seal assembly in accordance with the present invention utilizing a pair of axially polarized magnets attached to the housing and a pair of polepieces at opposite ends of the bearing assembly.
Figure 9:
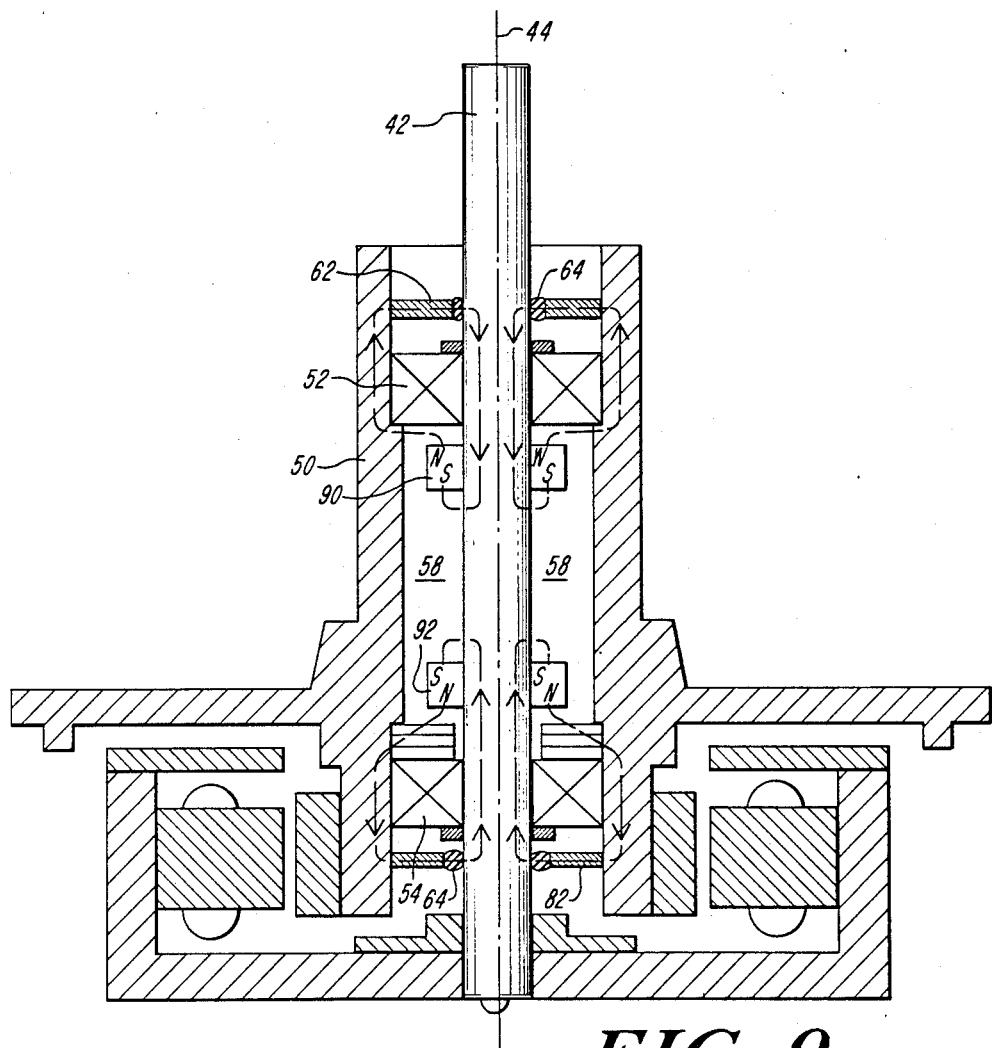
FIG. 9 is a cross-sectional view of a bearing and magnetic fluid seal assembly in accordance with the present invention utilizing a pair of axially polarized magnets attached to the shaft and a pair of polepieces at opposite ends of the bearing assembly.

Embodiments utilizing a pair of annular magnets in the space 58 are illustrated in FIGS. 8-9. In FIG. 8, a first axially polarized annular magnet 86 is located in the space 58 in close proximity to bearing 54 and is attached to housing 50. A second axially polarized annular magnet 88 is positioned in the space 58 in close proximity to bearing 52 and is attached to housing 50. The polepieces 62, 82 are positioned at opposite ends of the bearing assembly as described above in connection with FIG. 6. The housing 50 is made of nonmagnetic material to avoid magnetic shorting of magnets 86, 88. The shaft 42 is made of magnetically permeable material so that magnetic flux is conducted from magnet 86 to polepiece 82 and from magnet 88 to polepiece 62. The magnetic flux retains the magnetic fluid 64 in the respective gaps between polepieces 62, 82 and shaft 42. The embodiment of FIG. 8 provides one seal comprising magnet 88 and polepiece 62 and a second seal comprising magnet 86 and polepiece 82. The magnets 86, 88 are dimensioned so that their inside diameters are spaced from the shaft 42.

FIG. 9 illustrates an alternate embodiment of FIG. 8 wherein an axially polarized annular magnet 90 is located in the space 58 between the bearings 52 and 54 and is attached to the shaft 42 in close proximity to the bearing 52. An axially polarized annular magnet 92 is also located in the space 58 in close proximity to the bearing 54 and is attached to the shaft 42. The shaft 42 must be nonmagnetic to prevent magnetic shorting the magnets 90, 92. The housing 50 is of magnetically permeable material to conduct magnetic flux from magnet 90 to polepiece 62 and from magnet 92 to polepiece 82. The magnetic flux retains the ferrofluid 64 in the respective gaps between polepieces 62, 82 and shaft 42.

The embodiments discussed in FIGS. 6-9 are particularly useful for fixed shaft/rotating housing type of disk drive spindles.

The following gives specifications for magnetic fluid suitable for use in each of the above embodiments of the present invention.

| | |
|---|---|
| Saturation magnetization: | 100–500 gauss |
| Viscosity: | 20–2,000 cp at 27° C. |
| Type: | Low vapor pressure esters, hydrocarbons, poly ol esters, fluorocarbons, silicones and polyphenyl ethers |
| Electrical conductivity: | Conducting or nonconducting |

The polepieces 62, 82 are made of magnetically permeable material such as 400-Series stainless steel, have an axial dimension in the range of 0.5 mm to 1.5 mm and define a radial gap between the polepiece inside diameter and the associated shaft in the range of 0.07 mm to 0.25 mm. The magnets utilized in the embodiments of FIGS. 2–9 are polarized as specified and can be ferrites, Alnico, Sm-Co or Nd-Fe-B with an energy product in the range from $1.1 \times 10^6$ to $10 \times 10^6$ gauss-oersted.

EXAMPLE

A bearing and magnetic fluid seal assembly was constructed in accordance with the embodiment of FIG. 3. The spindle housing was nonmagnetic and the bearings were made of magnetic material. The spindle shaft had a diameter of 7 mm and the polepiece had an axial dimension of 1 mm. The radial gap between the polepiece inside diameter and the shaft was 0.20 mm. The polepiece inside diameter was 7.4 mm while the polepiece outside diameter was 19 mm. The magnet was rigid ferrite radially polarized, having an energy product of $1.6 \times 10^6$ gauss-oersted. The magnet length was 7.6 mm. The magnet inside diameter was 7 mm and the magnet outside diameter was 16.5 mm. The magnetic fluid type was 450 gauss, 300 cp at 27° C. and was ester based. The seal was tested for its pressure capacity which was found to be 250 mm $H_2O$.

While there has been shown and described what is at present considered the preferred embodiments of the present invention, it will be obvious to those skilled in the art that various changes and modifications may be made therein without departing from the scope of the invention as defined by the appended claims.

What is claimed is:

1. A magnetic fluid seal assembly comprising:
   a housing;
   a shaft having an axis of rotation;
   a bearing assembly for supporting said shaft and for permitting rotation of said shaft relative to said housing, said bearing assembly including at least two axially spaced-apart bearings between said shaft and said housing;
   annular magnet means axially positioned between said bearings for producing a magnetic field;
   polepiece means including an annular polepiece axially positioned outside said bearing assembly and extending inwardly from said housing toward said shaft, said polepiece having a closely-spaced, noncontacting relationship with said shaft, thereby defining a gap between said polepiece and said shaft, at least a portion of said magnetic field existing in said gap, said annular polepiece being spaced from said annular magnet means by one of said bearings, said polepiece means being located entirely outside said bearing assembly so as to form an open magnetic circuit wherein said annular magnet means is not in contact with said polepiece means; and
   a magnetic fluid retained by said magnetic field in the gap between said polepiece and said shaft, thereby providing on at least one end of said bearing assembly a low pressure capacity magnetic shaft seal having a short axial dimension.

2. A seal assembly as defined in claim 1 wherein said polepiece means includes annular polepieces axially positioned on opposite sides of said bearing assembly and extending inwardly from said housing toward said shaft, said polepieces each having a closely-spaced, noncontacting relationship with said shaft, thereby defining a gap between said polepiece and said shaft.

3. A seal assembly as defined in claim 1 or 2 wherein said annular magnet means comprises a radially polarized magnet attached to said housing and wherein said housing between said magnet and said polepiece is magnetically permeable.

4. A seal assembly as defined in claim 1 or 2 wherein said annular magnet means comprises a radially polarized magnet attached to said shaft and wherein said shaft between said magnet and said polepiece is magnetically permeable.

5. A seal assembly as defined in claim 1 or 2 wherein said annular magnet means comprises an axially polarized magnet attached to said housing, wherein said shaft is magnetically permeable and wherein said housing is nonmagnetic.

6. A seal asembly as defined in claim 1 or 2 wherein said annular magnet means comprises an axially polarized magnet attached to said shaft, wherein said shaft is nonmagnetic and wherein said housing is magnetically permeable.

7. A seal assembly as defined in claim 2 wherein said annular magnet means comprises a pair of spaced-apart axially polarized magnets.

8. A seal assembly as defined in claim 7 wherein said axially polarized magnets are attached to said housing, wherein said shaft is magnetically permeable and wherein said housing is nonmagnetic.

9. A seal assembly as defined in claim 7 wherein said axially polarized magnets are attached to said shaft, wherein said shaft is nonmagnetic and wherein said housing is magnetically permeable.

10. A seal assembly as defined in claim 1 or 2 wherein said magnetic fluid is electrically conductive.

11. A seal assembly as defined in claim 1 or 2 wherein each annular polepiece comprises a thin annular disk of magnetically permeable material.

12. A seal assembly as defined in claim 11 wherein each annular polepiece has an axial dimension in the range between 0.5 mm and 1.5 mm.

13. A seal assembly as defined in claim 1 or 2 wherein each bearng is magnetically permeable.

14. A seal assembly as defined in claim 1 wherein each bearing is nonmagnetic.

* * * * *